US007406063B2

(12) United States Patent
Jung et al.

(10) Patent No.: US 7,406,063 B2
(45) Date of Patent: Jul. 29, 2008

(54) METHOD FOR PROVIDING BROADCAST SERVICE OVER PACKET DATA CHANNEL IN A WIRELESS COMMUNICATION SYSTEM

(75) Inventors: Jung-Soo Jung, Seoul (KR); Dae-Gyun Kim, Seongnam-si (KR); Beom-Sik Bae, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 857 days.

(21) Appl. No.: 10/822,376

(22) Filed: Apr. 12, 2004

(65) Prior Publication Data

US 2004/0213214 A1    Oct. 28, 2004

(30) Foreign Application Priority Data

Apr. 10, 2003    (KR) ...................... 10-2003-0022688

(51) Int. Cl.
*H04Q 7/00* (2006.01)
(52) U.S. Cl. ......................... 370/329; 370/432; 455/450
(58) Field of Classification Search .............. 455/414.1, 455/412, 450, 445; 370/328–335, 342
See application file for complete search history.

(56) References Cited

U.S. PATENT DOCUMENTS 7,062,272 B2 *   6/2006   Grilli et al. ............... 455/435.1
2003/0054807 A1 *   3/2003   Hsu et al. .................... 455/414

* cited by examiner

*Primary Examiner*—Blane J Jackson
(74) *Attorney, Agent, or Firm*—The Farrell Law Firm, PC

(57) ABSTRACT

Disclosed is a method for receiving by a mobile station a broadcast service from a base station that transmits in the same time period data on a packet data channel and a packet data control channel corresponding to the packet data channel. In the method, the mobile station receives a broadcast service parameter message including parameters for a broadcast service, and transmits desired broadcasting data along with a packet data channel assignment request message based on the parameters. Further, the mobile station receives a packet data channel assignment message for the desired broadcast service in response to the packet data channel assignment request message. Thereafter, the mobile station decodes reception data on a packet data control channel corresponding to the assigned packet data channel to acquire control information, receives packet data on a packet data channel for the broadcast service according to the control information, and processes the received packet data as broadcast service data.

19 Claims, 9 Drawing Sheets

ECAM FOR PACKET DATA SERVICE

| FIELD | LENGTH (BITS) |
|---|---|
| ASSIGN_MODE | 3 |
| RESERVED_2 | 5 |
| FREQ_INCL | 1 |
| BAND_CLASS | 0 OR 5 |
| CDMA_FREQ | 0 OR 11 |
| ... | |
| NUM_PILOTS | 3 |
| ... | |

NUM_PILOTS PLUS ONE OCCURRENCE OF THE FOLLOWING RECORD:
{ (NUM_PILOTS)

| PILOT_PN | 9 |
|---|---|
| ... | |
| FOR_PDCH_INCL | 0 OR 1 |
| WALSH_TABLE_ID | 0 OR 3 |
| NUM_PDCCH | 0 OR 3 |

NUM_PDCCH + 1 OCCURRENCES OF THE FOLLOWING RECORD:
{ (NUM_PDCCH + 1)

| FOR_PDCCH_WALSH | 0 OR 6 |
|---|---|

} (NUM_PDCCH + 1)

| MAC_ID | 0 OR 8 |
|---|---|
| REV_CQICH_COVER | 0 OR 3 |
| FOR_CPCCH_WALSH | 0 OR 7 |
| FOR_CPCSCH | 0 OR 5 |
| PWR_COMB_IND | 1 |
| PDCH_GROUP_IND | 0 OR 1 |
| CODE_CHAN_FCH | 0 OR 11 |
| QOF_MASK_ID_FCH | 0 OR 2 |
| CODE_CHAN_DCCH | 0 OR 11 |
| QOF_MASK_ID_DCCH | 0 OR 2 |

} (NUM_PILOTS)

| RESERVED | 0-7 (AS NEEDED) |
|---|---|

FIG.3

ORIGINATION MESSAGE

| FIELD | LENGTH (BITS) |
|---|---|
| ... | |
| SPECIAL_SERVICE | 1 |
| SERVICE_OPTION | 0 OR 16 |
| ... | |
| FOR_PDCH_SUPPORTED | 0 OR 1 |
| FOR_PDCH CAPABILITY TYPE-SPECIFIC FIELDS | 0 OR VARIABLE |
| EXT_CH_IND | 0 OR 5 |
| BCS_ID | 0 OR 32 |

FIG.4

ECAM FOR BROADCASTING SERVICE

| FIELD | LENGTH (BITS) |
|---|---|
| ASSIGN_MODE | 3 |
| RESERVED_2 | 5 |
| FREQ_INCL | 1 |
| BAND_CLASS | 0 OR 5 |
| CDMA_FREQ | 0 OR 11 |
| ... | |
| NUM_PILOTS | 3 |

...

NUM_PILOTS PLUS ONE OCCURRENCE OF THE FOLLOWING RECORD:
{ (NUM_PILOTS)

| PILOT_PN | 9 |
|---|---|
| ... | |
| FOR_PDCH_INCL | 0 OR 1 |
| WALSH_TABLE_ID | 0 OR 3 |
| NUM_PDCCH | 0 OR 3 |

NUM_PDCCH + 1 OCCURRENCES OF THE FOLLOWING RECORD:
{ (NUM_PDCCH + 1)

| FOR_PDCCH_WALSH | 0 OR 6 |
|---|---|

} (NUM_PDCCH + 1)

| FOR BROADCAST_MAC_ID_INCL | 0 OR 1 |
|---|---|
| BROADCAST_MAC_ID | 0 OR 8 |
| MAC_ID | 0 OR 8 |
| ... | |

} (NUM_PILOTS)

| RESERVED | 0-7 (AS NEEDED) |
|---|---|

FIG.5

METHOD FOR PROVIDING BROADCAST SERVICE OVER PACKET DATA CHANNEL IN A WIRELESS COMMUNICATION SYSTEM

PRIORITY

This application claims priority under 35 U.S.C. § 119 to an application entitled "Method for Providing Broadcast Service Over Packet Data Channel In A Wireless Communication System" filed in the Korean Intellectual Property Office on Apr. 10, 2003 and assigned Serial No. 2003-22688, the contents of which are incorporated herein by reference.

BACKGROUND OF THE INVENTION

1. Field of the Invention

The present invention relates generally to a broadcast service method in a wireless data communication system, and in particular, to a method for providing a broadcast service to a mobile station over a packet data channel.

2. Description of the Related Art

The current communication environments are undergoing a sudden change without making any distinctions between wire/wireless areas and distinctions of regions and countries. In particular, such communication environment such as IMT-2000 (International Mobile Telecommunication 2000) tends to collectively provide information desired by a user as well as video and sound information on a real-time basis. In addition, with the development of mobile communication technology, the existing mobile communication systems enable a user to perform voice communication using a cellular phone and or a personal communications system (PCS) phone have evolved into advanced mobile communication systems capable of enabling a user not only to transmit text information but also to wirelessly view a broadcast service using a mobile station (MS).

In the broadcast service, a base station (BS) unidirectionally transmits high-rate forward data to a mobile station without reverse feedback information from the mobile station. In this regard the broadcast service is similar in concept to the general television broadcast service.

The current $3^{rd}$ Generation Partnership Project 2 (3GPP2) is considering various service media and efficient resource utilization for a broadcast service in mobile communication systems. However, when the existing common channel is so designed to provide high broadcast service performance even at a cell boundary, cell capacity is excessively wasted. To compensate for this waste of capacity a CDMA2000 communication system, a $3^{rd}$ generation mobile communication system, provides the broadcast service over a supplemental channel which is a dedicated channel proposed for a packet data service in order to reduce power consumption by a cell while to some extent securing the broadcast service performance.

For a broadcast service a supplemental channel uses a common long code mask instead of a dedicated long code mask. Performance of the supplemental channel, surpassing that of an existing common channel, is guaranteed by performing outer coding and autonomous handoff in which feedback information from a mobile station is not required during the broadcast service. In addition, the broadcast service prevents the mobile station from transmitting power control information and reverse feedback information, preventing a waste of cell capacity caused by a dedicated reverse channel. Theoretically, it is possible to accommodate an unlimited number of mobile stations within one cell.

Because the CDMA2000 communication system uses the outer coding technique instead of permitting retransmission even though there is a sufficient forward bandwidth for broadcasting data transmitted during the broadcast service, even a mobile station located at a cell boundary can obtain reception performance of a specific level with relatively lower power. However, when a radio channel condition instantaneously deteriorates in spite of the use of the outer coding technique, there is high possibility that the broadcasting data will be lost during transmission.

In order to meet users' demands for a mobile communication system capable of supporting a high-speed data service while supporting a voice service, a so-called 1×EVDV (Evolution Data and Voice) system has been proposed. The 1×EVDV system can transmit large amounts of data at high speed using a packet data channel (PDCH) capable of efficiently transmitting data compared to the existing supplemental channel.

The 1×EVDV system assigns all possible resources (spreading codes and power) to only one selected mobile station for a predetermined time period, using a dedicated identifier assigned to mobile stations receiving a data service. Upon failure to receive normal packet data for a time period assigned thereto, the mobile station transmits a non-Acknowledge signal (NAK) to a base station, and the base station repeatedly transmits the same packet data until an Acknowledge signal (ACK) is received from the mobile station.

However, when using the packet data channel as described above, the 1×EVDV system assigns a dedicated identifier to mobile stations so as to allow only a dedicated service, but does not support a service to be provided in common by all or some of mobile stations within a cell through the packet data channel. Although there is an identifier used to transmit system information to all mobile stations in the cell, because only one identifier is assigned to each cell, it cannot be used for a concurrent service for various broadcast contents and packet data.

Accordingly, there is a demand for a method capable of providing a more efficient broadcast service to mobile stations to enable them to receive a common service, using a forward packet data channel for a high-speed packet data service instead of a supplemental channel.

SUMMARY OF THE INVENTION

It is, therefore, an object of the present invention to provide a method for providing a broadcast service over a packet data channel in a wireless communication system.

It is another object of the present invention to provide a method for concurrently providing a dedicated data service and a broadcast service over a packet data channel in a CDMA2000 1×EVDV system.

It is further another object of the present invention to provide a method for the simultaneous use of a broadcast medium access control (MAC) ID and a dedicated MAC ID for a broadcast service over a packet data channel in a CDMA2000 1×EVDV system.

It is yet another object of the present invention to provide a method for supporting Hybrid Automatic Repeat Request (H-ARQ) for a broadcast service over a packet data channel in a CDMA2000 1×EVDV system.

It is still another object of the present invention to provide a method for improving reception performance by retransmitting defective broadcasting data for a broadcast service over a packet data channel in a CDMA2000 1×EVDV system.

The above and other objects are achieved by providing a method for receiving by a mobile station a broadcast service from a base station that transmits in the same time period data on a packet data channel and a packet data control channel corresponding to the packet data channel. In the method, the mobile station receives a broadcast service parameter message including parameters for a broadcast service, and transmits desired broadcasting data along with a packet data channel assignment request message based on the parameters. Further, the mobile station receives a packet data channel assignment message for the desired broadcast service in response to the packet data channel assignment request message. Thereafter, the mobile station decodes reception data on a packet data control channel corresponding to the assigned packet data channel to acquire control information, receives packet data on a packet data channel for the broadcast service according to the control information, and processes the received packet data as broadcast service data.

The above and other objects are achieved by providing a method for providing a broadcast service to mobile stations by a base station that transmits in the same time period data over a packet data channel and a packet data control channel corresponding to the packet data channel. In the method, the base station transmits a packet data channel assignment message for a broadcast service, if a packet data channel assignment request message including particular broadcast service information is received after transmitting a broadcast service parameter message including parameters for a broadcast service. Further, the base station transmits packet data for the requested broadcast service over the assigned packet data channel, and transmits control information over a packet data control channel corresponding to the packet data channel.

BRIEF DESCRIPTION OF THE DRAWINGS

The above and other objects, features and advantages of the present invention will become more apparent from the following detailed description when taken in conjunction with the accompanying drawings in which:

FIG. 3 is a diagram illustrating a format of a common extended channel assignment message (ECAM);

FIG. 4 is a diagram illustrating a format of an origination message according to an embodiment of the present invention;

FIG. 5 is a diagram illustrating a format of an ECAM including a broadcast MAC ID according to an embodiment of the present invention;

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

The present invention provides a method for supporting a broadcast/multicast service over a forward packet data channel (F-PDCH) for high-speed data transmission in a CDMA2000 1×EVDV system which is a high-speed packet data communication system. In particular, the present invention provides a method for supporting a concurrent service of a broadcast/multicast service and a dedicated service. Here, the "dedicated service" refers to a packet data service performed on a unicast basis.

Figure 1:
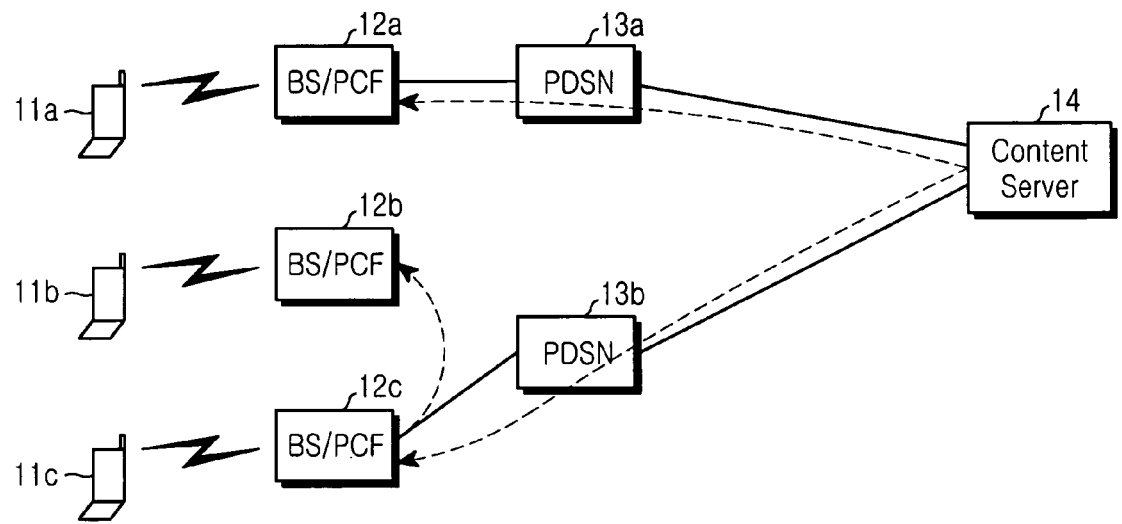
FIG. 1 is a diagram illustrating a configuration of a broadcast service system according to an embodiment of the present invention.

FIG. 1 is a diagram illustrating the configuration of a broadcast service system according to an embodiment of the present invention. Referring to FIG. 1, a broadcasting service server or a contents server (CS) 14 generates broadcasting data including video and sound data for a broadcast service in the form of a compressed Internet protocol (IP) packet, and sends the generated broadcasting data to base stations (BS) 12a, 12b and 12c via a packet communication network such as the Internet and packet data service nodes (PDSNs) 13a and 13b. Each of the base stations 12a, 12b and 12c comprises a well-known base transceiver subsystem (BTS) and base station controller (BSC), to which a packet control function (PCF) is added, and it is represented by BS/PCF in FIG. 1.

In order to send the generated broadcasting data to the base stations 12a, 12b and 12c, the broadcasting service server 14 uses IP multicast. The base stations 12a, 12b and 12c constitute a multicast group for receiving IP multicast data from the broadcasting service server 14. Membership information of the multicast group is maintained by an undepicted multicast router (MR) connected to each of the base stations 12a, 12b and 12c.

IP multicast data including video and sound data generated in the broadcasting service server 14 is multicasted to the base stations 12a, 12b and 12c constituting the multicast group, and the base stations 12a, 12b and 12c convert the IP multicast data into a radio frequency (RF) signal, and transmit the RF signal within their service areas. The IP multicast data is represented by a dotted line in FIG. 1.

Figure 2:
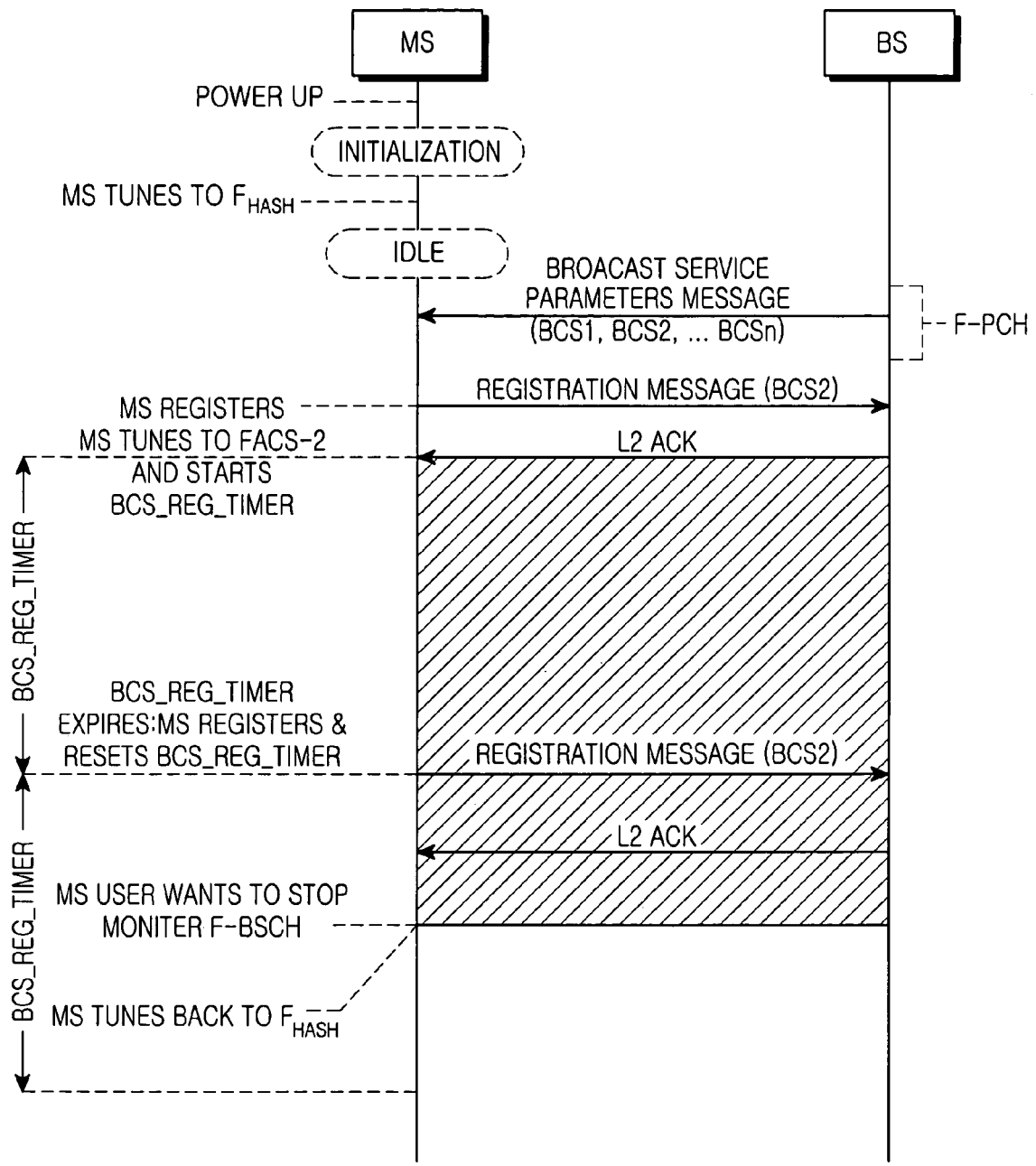
FIG. 2 is a message flow diagram illustrating a broadcast service procedure between a mobile station and a base station according to an embodiment of the present invention.

The present invention is related to a radio section (or radio link) between a mobile station and a base station in the broadcast service system, and FIG. 2 is a message flow diagram illustrating a broadcast service procedure between a mobile station and a base station according to an embodiment of the present invention.

Referring to FIG. 2, upon power up, a mobile station (MS) performs initialization in step 10 and then acquires session information for a broadcast service by receiving a broadcast service parameter message (BSPM) 11 transmitted by a base station (BS) over a common channel through a frequency band $f_{HASH}$ to which it is tuned, in order to receive the broadcast service.

Major information contained in the BSPM 11 includes (i) a frequency for a broadcast service, (ii) code information for a physical channel, (iii) a transfer rate of the corresponding physical channel, (iv) a broadcast service identifier (BCS ID) indicating a service type for identification between a mobile station and a base station, (v) a physical channel index, and (vi) a broadcast service reference indentifier (BSR ID) indicating the contents of a service. A mobile station combines the BCS ID, the physical channel index and the BSR ID to determine whether logical information is mapped with a physical channel. By doing so, the mobile station can determine which service is performed in the corresponding physical channel.

In addition, the BSPM 11 includes information on neighbor cells in order to enable a mobile station to perform handoff to its neighbor base stations when necessary. That is, the BSPM includes information indicating the possibility of handoff, and a code and a transfer rate of physical channels of the neighbor cells. In the case of an autonomous handoff, the mobile station acquires information on neighbor cells through the BSPM 11, and combines signals from corresponding neighbor cells based on the acquired information thereby increasing reception performance.

In FIG. 2, the BSPM 11 includes BCS IDs BCS1, BCS2, . . . , BCSn for n broadcast services. Upon acquiring a BCS ID, for example BCS2, of a desired broadcast service through the BSPM 11, the mobile station turns to a corresponding service frequency $f_{BCS2}$ detected through an FBSCH_FREQ field, and thereafter transmits a registration message at step 12 to perform a location registration procedure, and receives the desired broadcast service over a broadcast service channel (BSCH) at the service frequency.

The mobile station should be able to receive a call request for a voice call service, i.e. a paging signal by the system, even during a broadcast service. In addition, in the broadcast service, registration can be performed at a fixed time to use the registration result for accounting or other purposes. Therefore, during the broadcast service, the mobile station periodically transmits a location registration message at periods controlled by a timer which is set with a timer value (1 to 10 minutes) indicated by a BCS_REG_TIMER field in the BSPM, and receives L2 ACK 13 as a response thereto. If a user of the mobile station desires to stop the broadcast service, the mobile station stops monitoring the $f_{BCS2}$ and turns back to the original frequency $f_{HASH}$. In FIG. 2, a shadowed part denotes a time period for which the mobile station is receiving the broadcast service.

When a supplemental channel commonly used for the broadcast service is used, power control information and reverse feedback information are not required. However, when a packet data channel (PDCH) defined in the 1×EVDV system is used, it is possible to more efficiently transmit multimedia data compared with when the power control information and the reverse feedback information are used.

A description will now be made of data transmission over a packet data channel in a 1×EVDV system. The 1×EVDV system is a system capable of concurrently supporting an existing CDMA2000 1× service and a high-speed forward packet data service within a 1.25-MHz frequency band, and transmits at high speed massive packet data over a forward packet data channel (F-PDCH). The packet data channel is a traffic channel commonly accessed by mobile stations receiving a high-speed data service, and uses time division multiplexing (TDM) and code division multiplexing (CDM) in combination.

When a mobile station sends a high-speed packet data service request to a base station or when the base station connects a high-speed packet data service to the mobile station, the mobile station negotiates with the base station for parameters necessary for the high-speed packet data service. The base station assigns to the mobile station channel information related to the packet data channel and a dedicated user ID. In the 1×EVDV system, the user ID is called a media access control (MAC) ID, and in the following description, it will be referred to as MAC ID.

A MAC ID is included in a channel setup-related message, i.e., an extended channel assignment message (ECAM) or a universal handoff direction message (UHDM), and then transmitted to a mobile station. The ECAM has been developed from a channel assignment message known in the existing CDMA cellular system and is used to initialize radio channels during call setup, while the UHDM has been developed from a known handoff direction message and is used to initialize radio channels for an incoming call during handoff.

FIG. 3 is a diagram illustrating a format of a common ECAM. Major information fields of the ECAM will be described with reference to FIG. 3. During assignment of a packet data channel, an ASSIGN_MODE field of the ECAM is set to '101'. The ECAM includes a user ID MAC_ID assigned to a mobile station in addition to channel setup information including (i) a frequency CDMA_FREQ used for a packet data channel, (ii) an extended code table ID WALSH_TABLE_ID, (iii) a pseudo-random noise (PN) code offset PILOT_PN of a common pilot channel, and (iv) extended codes FOR_PDCCH_WALSH and FOR_CPCCH_WALSH for a packet data control channel (PDCCH) and a common power control channel (CPCCH), for each of the sectors constituting an active set.

When transmitting packet data to a mobile station over PDCH, a base station simultaneously transmits control information related to the transmission of the packet data on the PDCH over a corresponding packet data control channel (PDCCH). The control information includes a MAC ID assigned to the mobile station, and the MAC ID becomes a reception address of packet data transmitted in a time period identical to the time period for which the control information is transmitted. The mobile station extracts the MAC ID by analyzing the control information received over the PDCCH, determines whether the extracted MAC ID is identical to the MAC ID assigned thereto, and receives packet data over PDCH for a corresponding time period if the MAC IDs are identical to each other.

A mobile station to which the PDCH is connected measures channel qualities for signals received over common pilot channels from base stations included in an active set which is a list of base stations with which the mobile station is currently communicating, compares the measurement values to select a base station to which the mobile station will transmit reverse channel status information, and reports to the selected base station a channel quality indicator (CQI) indicating channel quality of the selected base station. The selected base station selects one mobile station for each time period using CQIs reported from a plurality of mobile stations which are performing communication within it's the base station's own cell, including the corresponding mobile station, and determines the transmission parameter and the control information necessary for transmitting the packet data to the selected mobile station.

The control information includes information related to a MAC ID of the selected mobile station, a packet data size, a Walsh code index, a subpacket ID (SP ID), and an ARQ identifier sequence number (AISN). The packet data for the selected mobile station is transmitted over the PDCH according to the transmission parameter, and during the same time period, the control information is transmitted to the selected mobile station over a packet data control channel (PDCCH) spread with a known spreading code different from for the spreading code of the PDCH.

The mobile station determines whether the PDCH was assigned thereto for the same time period, based on the control information received over the PDCCH, and if so, receives packet data by decoding the PDCH. Here, if a MAC ID included in control information received over the PDCCH for a predetermined time period is matched with a dedicated MAC ID assigned to the mobile station itself, the mobile station determines that the PDCH was assigned for the same time period.

The mobile station determines if the received packet data is defective, and feeds back to a base station an Acknowledge signal (ACK) or a non-Acknowledge signal (NAK) indicating successful reception or unsuccessful reception of the packet data, and the base station retransmits the same packet data or transmits new packet data based on the feedback information.

In a normal case, each of mobile stations performing communication within a service area, or a cell, of a particular base station is assigned a unique MAC ID. Therefore, in order to provide a broadcast service to the mobile stations, a broadcast MAC ID for the broadcast service should be used. The present invention assigns to a mobile station a dedicated MAC ID for a packet data service and a broadcast MAC ID to be used for a broadcast service, to thereby provide the broadcast service over a packet data channel.

A description will now be made of a broadcast service procedure using a packet data channel according to an embodiment of the present invention. A mobile station acquires information on a broadcast service by receiving a BSPM transmitted from a base station, and requests a broadcast service using the acquired information. In order to send a base station a request to join a broadcast service transmitted over a forward packet data channel (F-PDCH), the mobile station specifies in an origination message a service option of the broadcast service using the F-PDCH. That is, the mobile station transmits to the base station an origination message including a service option of a desired broadcast service and a BCS ID, to request to join the broadcast service to the base station.

FIG. 4 is a diagram illustrating a format of an origination message according to an embodiment of the present invention. As illustrated, the origination message includes a 1-bit SPECIAL SERVICE field, a 16-bit SERVICE OPTION field, and a 32-bit BCS ID field. The BCS ID field is included only when a value of the SERVICE OPTION field is identical to an option value corresponding to the broadcast service, and otherwise, it is omitted.

Upon receiving a broadcast service request, the base station determines if the mobile station is suitable for receiving the broadcast service and if the mobile station can join in the broadcast service, and transmits a broadcast MAC ID corresponding to a broadcast service of a BCS ID requested by the mobile station, using an ECAM, based on the determination results.

FIG. 5 is a diagram illustrating a format of an ECAM including a broadcast MAC ID according to an embodiment of the present invention. In comparison with the common ECAM of FIG. 3, an ECAM transmitted in response to a broadcast service request from a mobile station further includes a 1-bit FOR_BROADCAST_MAC_ID_INCL field and an 8-bit BROADCAST_MAC_ID field in addition to an 8-bit MAC_ID field indicating a dedicated MAC ID for a packet data service. The FOR_BROADCAST_MAC_ID_INCL field is a flag for indicating if the BROADCAST_MAC_ID field is included, and the BROADCAST_MAC_ID field is included only when the FOR_BROADCAST_MAC_ID_INCL field has a value of '1'. The BROADCAST_MAC_ID field, distinguished from the dedicated MAC_ID field, indicates a broadcast MAC ID for a broadcast service.

Because the dedicated MAC ID is used for a packet data service, it is uniquely assigned to each of the mobile stations in service within a service area of a particular base station. However, because the broadcast MAC ID is used for a broadcast service, the broadcast MAC ID can be assigned in common to a plurality of mobile stations. That is, a plurality of mobile stations receiving the same broadcast service use the same broadcast MAC ID. A reserved value of 1 to 63 in a possible range of a MAC ID which can be set by a base station is used as a value of the broadcast MAC ID. Here, "reserved values" mean values unused for the current packet data service or predetermined values to be used for a broadcast service.

The format of an ECAM illustrated in FIG. 5 includes both the BROADCAST_MAC_ID field and the MAC_ID field. However, in a modified embodiment of the present invention, when transmitting an ECAM in response to a broadcast service request from a mobile station, a base station sets a FOR_BROADCAST_MAC_ID_INCL field of the ECAM to '1' to thereby include only the BROADCAST_MAC_ID field in the ECAM and omit the MAC_ID field before transmission. In this case, the mobile station can be assigned only a broadcast MAC ID without a dedicated MAC ID.

Meanwhile, if the mobile station is already assigned a dedicated MAC ID, the base station sets the MAC_ID field to the assigned dedicated MAC ID. Otherwise, the base station may set the MAC_ID field to NULL '0'. In another case, if the mobile station is not assigned a dedicated MAC ID, the base station may assign the dedicated MAC ID to the mobile station while assigning a broadcast MAC ID, and load the assigned MAC IDs into corresponding fields of the ECAM before transmission. In this case, even though a value of the FOR_BROADCAST_MAC_ID_INCL field is '1', the ECAM includes the MAC_ID field. In yet another case, when transmitting an ECAM in response to a broadcast service request from the mobile station, the base station may always set the MAC_ID field to a value, e.g., NULL '0', previously agreed between the base station and the mobile station irrespective of whether or not a dedicated MAC ID is assigned to the mobile station.

Because a broadcast MAC ID is transmitted by a UHDM to a mobile station moving to a service area of another base station during a handoff, the mobile station can seamlessly receive a broadcast service even while moving between cells. That is, if a mobile station moves from a source base station to a target during a handoff, the source base station detects the movement of the mobile station and then transmits to the mobile station a UHDM including a new broadcast MAC ID with which the mobile station can receive the same broadcast service in a service area of the target base station. The mobile station can continue to receive the same broadcast service using the new broadcast MAC ID.

Figure 6:
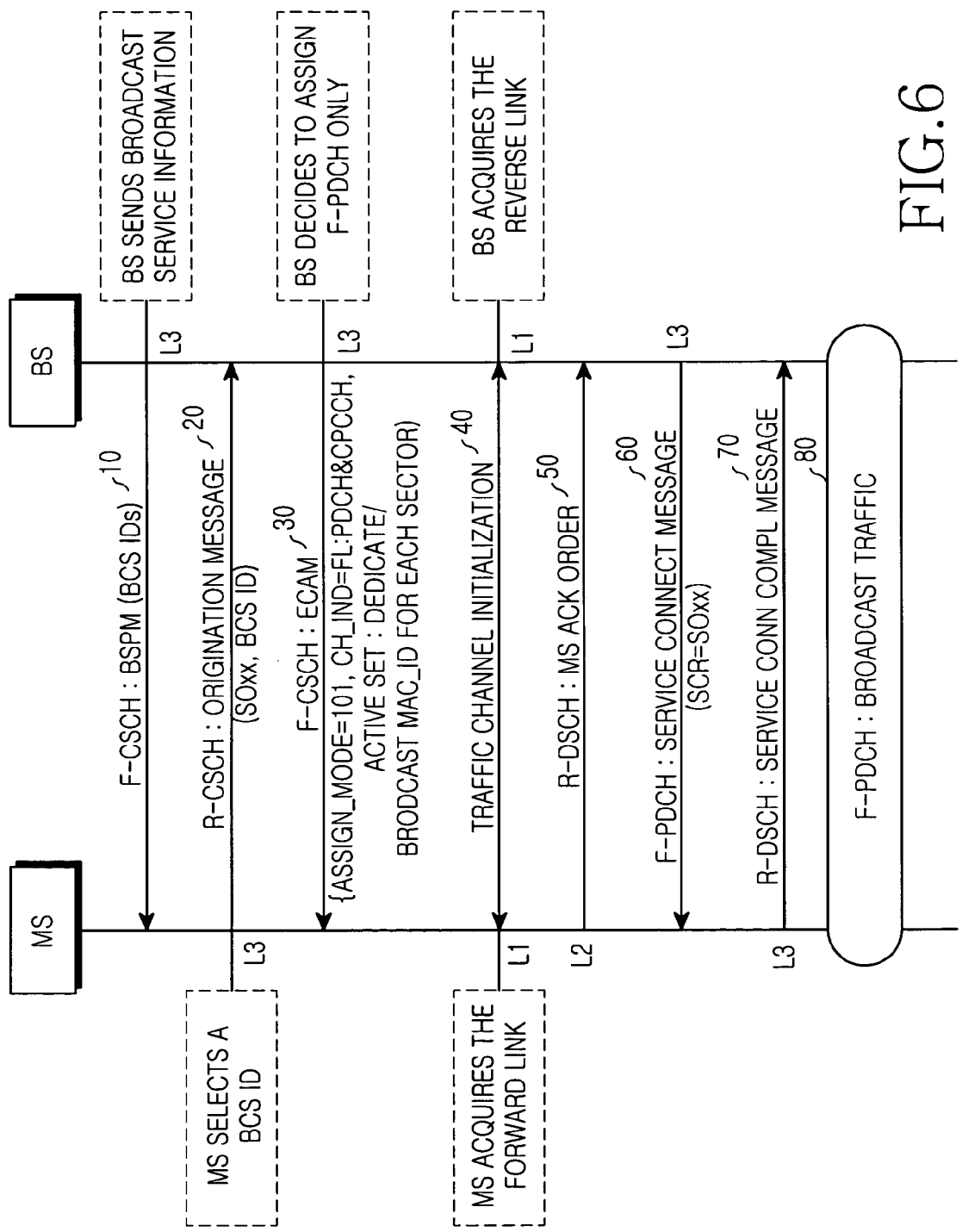
FIG. 6 is a message flow diagram illustrating a procedure for setting a broadcast service according to an embodiment of the present invention.

FIG. 6 is a message flow diagram illustrating a procedure for setting a broadcast service according to an embodiment of the present invention. Referring to FIG. 6, in step 10 a mobile station requesting receptions of a broadcast service acquires information on broadcast services by receiving a BSPM from a base station in service. The mobile station selects a desired broadcast service, and if the broadcast service is provided on PDCH, loads a BCS ID of the selected broadcast service and a service option SOxx of the broadcast service on PDCH into an origination message, and transmits the origination message to the base station to request the base station to set a broadcast service, in step 20. The base station determines if the mobile station is suitable for a broadcast service. If it is determined that the mobile station is suitable for a broadcast service, the base station assigns a PDCH and transmits an ECAM including a broadcast MAC ID (and a dedicated MAC ID) to the mobile station, in step 30. An ASSIGN_MODE field in the ECAM is set to '101' in order to indicate setup of PDCH.

When assigning PDCH based on an ECAM, i.e. when ASSIGN_MODE='101', the base station combines the PDCH and a channel for a signaling message, using an EXT_CH_IND field (not shown in FIG. 4). Herein, the PDCH and a common power control channel (CPCCH) are mapped with each other in a forward link (FL) based on the EXT_CH_IND field.

A base station detects state information of neighbor base stations through state information of a forward channel reported by a mobile station, and determines an active set which is a list of neighbor base stations having a high possibility handoff, based on the detected state information. That is, the active set is comprised of several base stations, forward channels from which have highest signal strength. When assigning the PDCH using an ECAM, the base station can transmit the information relating to the active set excluding the base station itself. In this case, the ECAM includes dedicated and broadcast MAC IDs for a base station (or a sector in the case of a sector type base station) included in the active set.

Upon receiving the broadcast MAC ID, in step 40 the mobile station and the base station acquire PDCH and reverse channel like FCH by performing traffic channel initialization. Here, "Acquisition of PDCH" means that communication between the mobile station and the base station over the PDCH is available. In step 50, the mobile station transmits an MS Ack Order to the base station. The base station transmits in step 60 a service connect message including a service option SOxx for a broadcast service to the mobile station over the PDCH, and receives in step 70 a service connect complete message from the mobile station in response thereto. "Acquisition of PDCH" means that communication between the mobile station and the base station over the PDCH is available.

When the setting of a broadcast service is completed, the mobile station can receive, in step 80, broadcasting packet data transmitted over the PDCH using the broadcast MAC ID.

When transmitting broadcasting packet data to the mobile station over PDCH, the base station simultaneously transmits control information related to the PDCH over a corresponding packet data control channel (PDCCH). The control information includes error check information masked with a broadcast MAC ID assigned to the mobile station. The mobile station receives the control information over PDCCH and determines if the received control information is defective by checking the masked error check information with its own dedicated MAC ID or broadcast MAC ID. If it is determined that the control information was masked with its own MAC ID and no transmission error has occurred in the control information, the mobile station analyzes the control information and determines if an extracted MAC ID is identical to the broadcast MAC ID assigned thereto. If the MAC ID is identical to the broadcast MAC ID, the mobile station receives broadcasting packet data over the PDCH for a corresponding time period. Upon failure to correctly receive the packet data, the mobile station transmits the NAK over a reverse acknowledge channel (R-ACKCH). And upon success for correctly receive the packet data, the mobile station transmits the ACK over R-ACKCH. The base station determines whether or not to retransmit the same packet data taking into consideration the feedback information from the mobile station and a forward bandwidth.

That is, in a broadcast service according to an embodiment of the present invention, the base station retransmits broadcasting packet data according to feedback information from the mobile station receiving the broadcast service. A retransmission criterion is implemented in various ways according to an implementation scheme and a service policy. For example, when there is a lower amount of forward data, the base station retransmits all of the broadcasting packet data for which NAK was received from any mobile station. In this case, the base station discards corresponding broadcasting packet data only after ACKs are received from all mobile stations, and starts transmission of the next broadcasting packet data. Meanwhile, when the amount of data or a quality of service (QoS) is taken into consideration, if all retransmission requests cannot be accepted, the base station may set a particular threshold and retransmits broadcasting packet data. For example, the base station may retransmit only the broadcasting packet data for which a ratio of mobile stations that transmitted NAK among all mobile stations receiving the broadcast service exceeds the threshold.

The ACK/NAK is transmitted over a reverse ACKCH, and expresses the normal/abnormal reception of packet data using 1-bit information. If the NAK is received from a mobile station, the base station shifts packet data transmitted to the mobile station to a retransmission buffer, determines a next transmission time for the mobile station taking into consideration a remaining bandwidth, and retransmits the packet at the determined transmission time. When transmitting a retransmission packet over F-PDCH, the base station transmits over F-PDCCH an ARQ identifier sequence number (AISN) which is identical to the one used at the initial transmission, an ARQ channel identifier (ACID) for identifying ARQ channels, and a subpacket identifier (SPID) indicating decoding information of a packet transmitted according to a retransmission number.

In this way, the base station determines whether or not to retransmit particular packet data for a broadcast service, considering the ACK/NAK from each mobile station and a remaining bandwidth. If the remaining bandwidth is sufficient and the base station retransmits packet data that many mobile stations have failed to receive, the entire QoS of the broadcast service can be improved.

Figure 7:
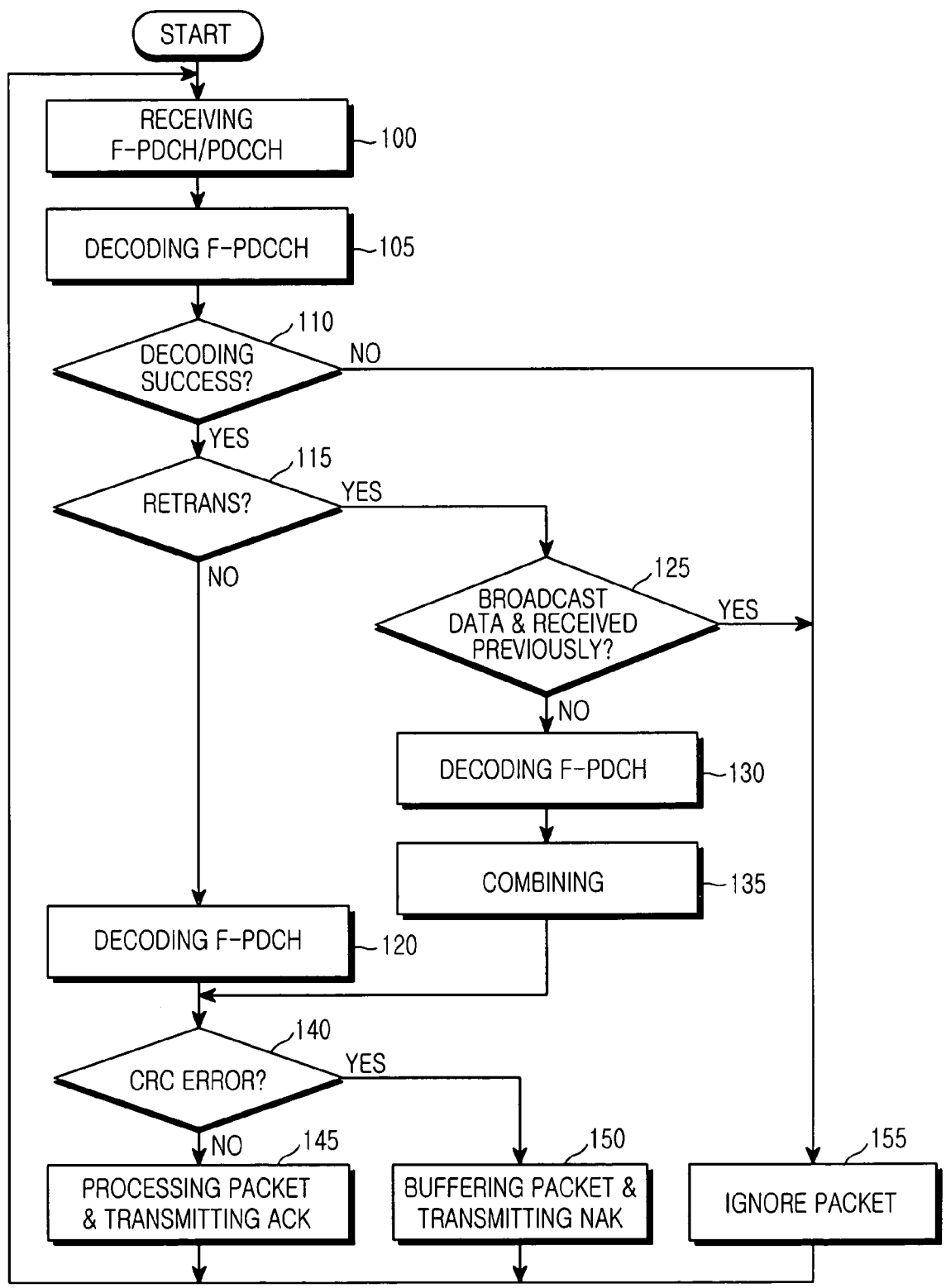
FIG. 7 is a flowchart illustrating a procedure for performing a broadcast service by a mobile station according to an embodiment of the present invention.

FIG. 7 is a flowchart illustrating a procedure for performing a broadcast service by a mobile station according to an embodiment of the present invention. Referring to FIG. 7, the mobile station receives PDCH data and corresponding PDCCH data for each time period in step 100, and decodes in step 105 the received PDCCH data using its dedicated and broadcast MAC IDs to acquire control information. If it is determined in step 110 that decoding of the PDCCH was unsuccessful, the mobile station proceeds to step 155 where it discards the received PDCH data. In contrast, if it is determined in step 110 that control information is acquired through successful decoding of the PDCCH, the mobile station proceeds to step 115. Here, the control information includes a MAC ID, a packet data size, a Walsh code index, and HARQ-related information such as an AISN, an ACID and an SPID.

In step 115, the mobile station determines whether or not the received PDCH data is retransmitted data, based on the control information. Whether or not the received PDCH data is retransmitted data can be determined by determining if the AISN, ACID and SPID extracted form the control information have values representing retransmission. If the received PDCH data is not retransmitted data, the mobile station acquires packet data by decoding the received PDCH data in step 120, and then proceeds to step 140. If it is determined by step 115 that the received PDCH data is retransmitted data, the mobile station determines in step 125 if the received data is for broadcast service and the same packet data has already been received successfully. If the same packet data was already received, the mobile station proceeds to step 155 where it discards the received PDCH data.

If it is determined in step 125 that the same packet data was not successfully received, the mobile station acquires packet data by decoding the received PDCH data in step 130, and combines the acquired packet data with the previously received packet data by a combining scheme such as Asynchronous Adaptive Incremental Redundancy (AAIR) in step 135, and then proceeds to step 140. Here, "combining" means a process of acquiring complete packet data by combining previously received defective packet data with currently received packet data. This process is well known to these skilled in ARQ, and therefore a detailed description thereof will be omitted.

In step 140, the mobile station performs cyclic redundancy code (CRC) check on the packet data to determine if a CRC error has occurred. If no CRC error has occurred, the mobile station processes the packet data and feeds back the ACK over R-ACKCH in step 145. In contrast, if it is determined in step 140 that a CRC error has occurred, the mobile station buffers the packet data to combine it with packet data to be retransmitted later, and feeds back the NAK over R-ACKCH in step 150. The mobile station extracts video and sound data for a desired broadcast service from the packet data, and outputs the extracted data via output means such as a display and a speaker.

Figure 8:
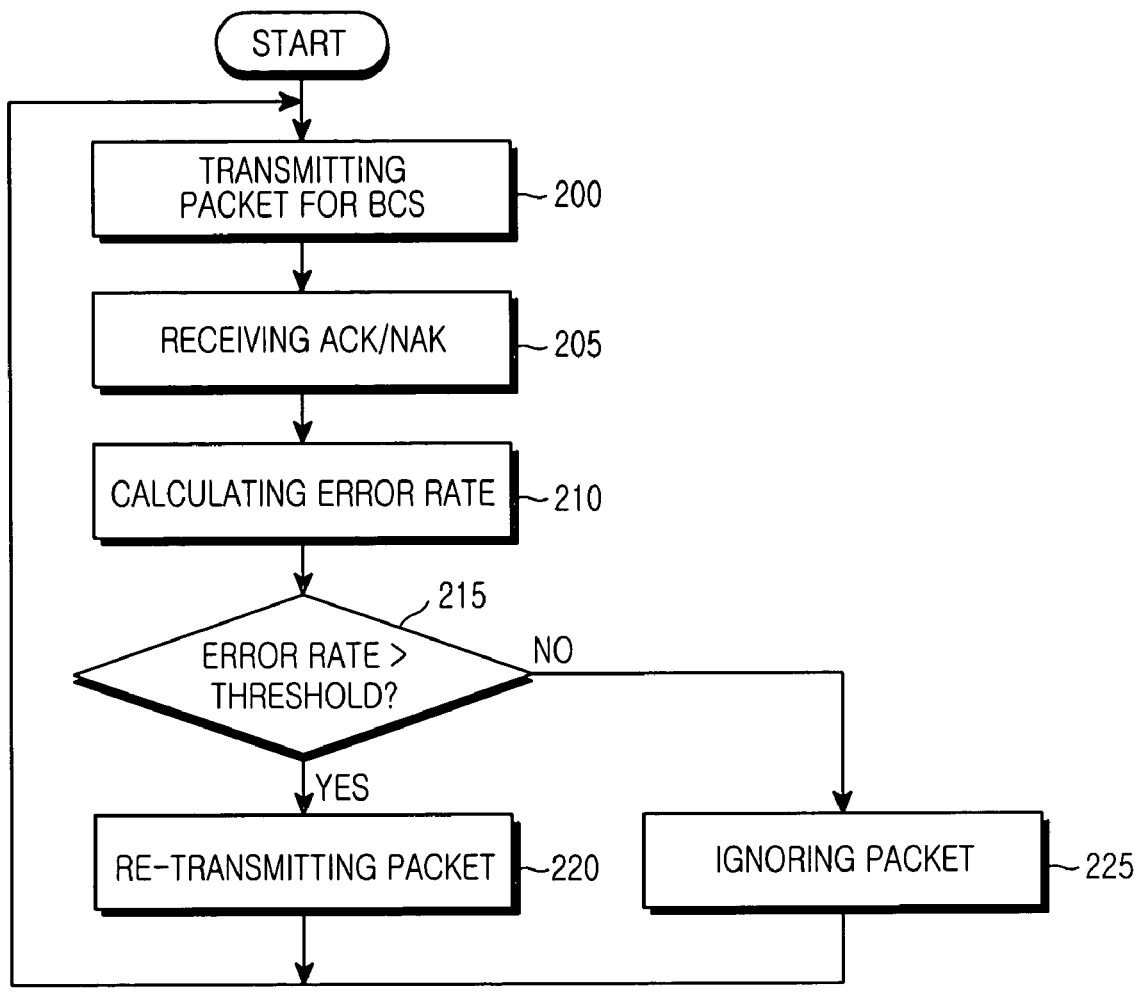
FIG. 8 is a flowchart illustrating a procedure for performing a broadcast service by a base station according to an embodiment of the present invention.

FIG. 8 is a flowchart illustrating a procedure for performing a broadcast service by a base station according to an embodiment of the present invention. The base station retransmits packet data when the number of NAKs received for transmitted broadcasting packet data is greater than or equal to a predetermined threshold.

Referring to FIG. 8, the base station transmits packet data for a broadcast service for each time period in step 200. After the time duration for ACK/NACK reception is elapsed, the base station receives the ACK or the NAK as a response to the transmitted packet data, from all mobile stations in broadcast service within its service area in step 205, and in step 210 calculates an error rate according to a ratio of mobile stations that transmitted the NAK among all mobile stations in broadcast service. The base station determines in step 215 if the calculated error rate is greater than or equal to a predetermined threshold. If the calculated error rate is greater than or equal to the threshold, the base station transfers the packet data to retransmission buffer in step 220. If the calculated error rate is not greater than or equal to the threshold, the base station discards the packet data in step 225.

Figure 9:
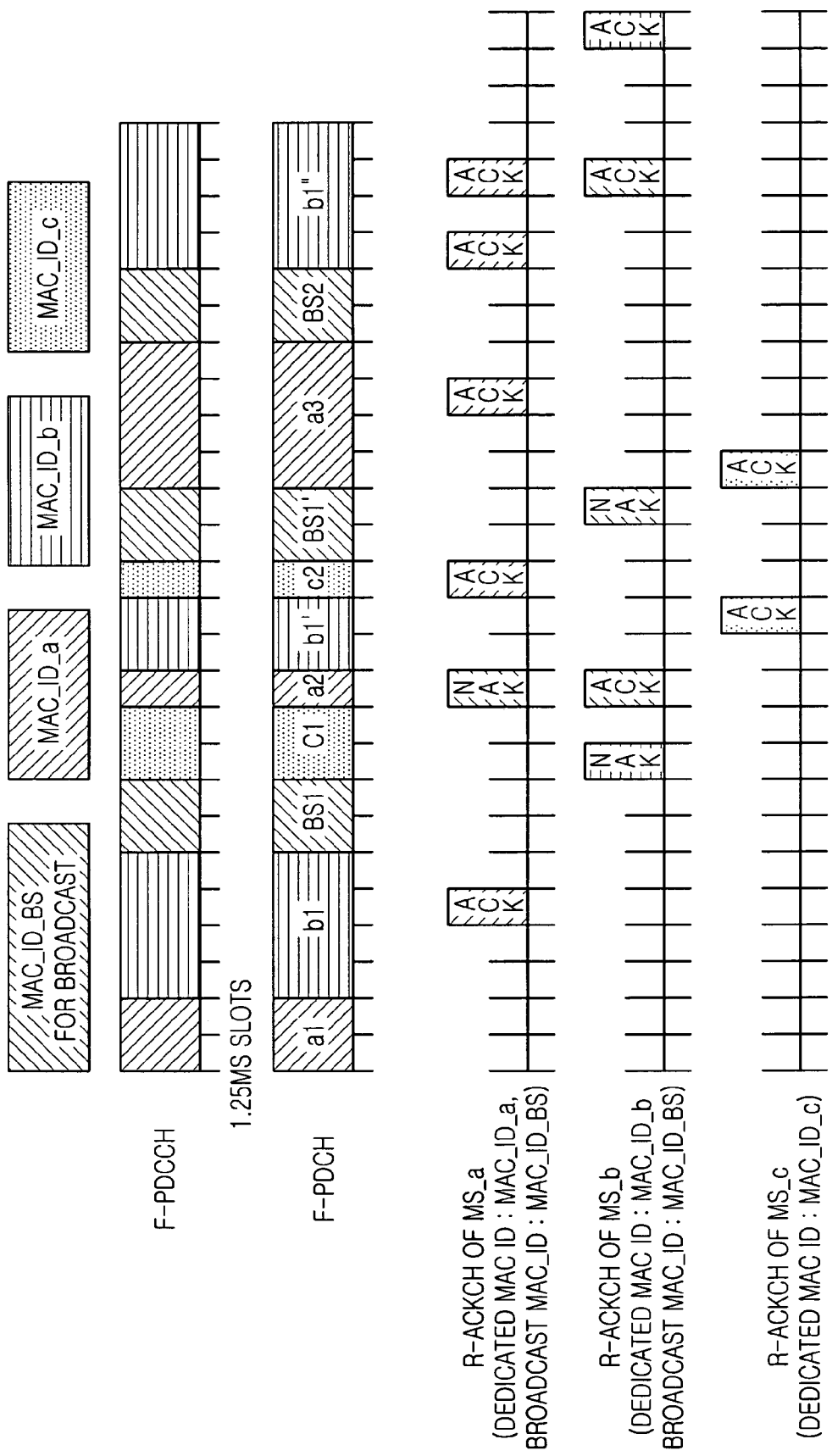
FIG. 9 is a diagram illustrating an example of a broadcast service over F-PDCH according to an embodiment of the present invention.

FIG. 9 is a diagram illustrating an example of a broadcast service over an F-PDCH according to an embodiment of the present invention. Referring to FIG. 9, a base station concurrently performs a dedicated packet data service and a broadcast service using the F-PDCH. Three mobile stations MS_a, MS_b and MS_c in communication with the base station have their unique dedicated MAC IDs MAC_ID_a, MAC_ID_b and MAC_ID_c, respectively, and among them, two mobile stations MS_a and MS_b commonly have been assigned a broadcast MAC ID MAC_ID_BS for a broadcast service. It is assumed herein that packet data is transmitted over one, two or four 1.25-ms slots, that the mobile stations perform an ARQ operation described in connection with FIG. 7, and that a delay required in transmitting the ACK/NAK by mobile stations is a 2-slot length.

Packet data for a broadcast service transmitted from the base station is represented by oblique lines tilted from the top right to the bottom left, packet data for the MS_a is represented by oblique lines tilted from the top left to the bottom right, packet data for the MS_b is represented by horizontal lines, and packet data for the MS_c is represented by shadows.

The MS_a and the MS_b transmit the NAK and the ACK over R-ACKCH, respectively, after receiving broadcasting packet data BS1. In response, the base station retransmits the BS1. The retransmitted BS1 is represented by BS1'. If the MS_a initially normally receives the BS1', it feeds back ACK to the base station. In addition, if the MS_b determines that the BS1' is retransmitted data, it discards the BS1' and then transmits an ACK or an NAK. The base station determines that all mobile stations in broadcast service have normally received the broadcasting packet data BS1 through an ACK previously received from the MS_b and an NAK currently received from the MS_a.

As a result, the present invention transmits broadcast packet data over a packet data channel proposed in the 1xEVDV system, thereby enabling a stable high-speed broadcast service. In addition, the present invention can concurrently support a packet data service or a Voice over Internet Protocol (VoIP) service during a broadcast service in the light of a characteristic of the packet data channel, and can also be used in providing an interactive broadcast service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for receiving by a mobile station a broadcast service from a base station that transmits in the same time period a packet service over a single forward packet data channel and a packet data control channel corresponding to the single forward packet data channel, comprising the steps of:

receiving a broadcast service parameter message including parameters for a broadcast service;

transmitting desired broadcast service parameters along with a broadcast service request message based on the parameters;

receiving a packet data channel assignment message for the desired broadcast service in response to the packet data channel assignment request message; and decoding reception data on the packet data control channel corresponding to the single forward packet data channel to acquire control information, receiving packet data for the broadcast service according to the control information at the same time as packet data for the packet service on only the single forward packet channel, and processing the received packet data as broadcast service data.

2. The method of claim 1, wherein the packet data channel assignment message includes a broadcast user identifier (ID) used as packet data address information for a desired broadcast service.

3. The method of claim 2, wherein the broadcast user ID is commonly assigned to a plurality of mobile stations.

4. The method of claim 1, wherein the packet data channel request message includes a BCS ID.

5. The method of claim 1, further comprising the step of performing an error check on the packet data, and transmitting an acknowledge signal (ACK) if it is determined that there is no error as a result of the error check.

6. The method of claim 1, further comprising the step of performing an error check on the packet data, and buffering the packet data after transmitting a non-acknowledge (NAK) signal if it is determined that there is an error as a result of the error check.

7. The method of claim 1, further comprising the step of discarding reception data on the packet data channel upon failure to decode reception data on the packet data control channel.

8. The method of claim 1, wherein the control information includes retransmission information indicating if the reception data on the packet data channel is retransmitted data.

9. The method of claim 8, further comprising the steps of:
   determining if the reception data on the packet data channel is retransmitted data, based on the retransmission information included in the control information; and
   if the reception data on the packet data channel is not retransmitted data, decoding the reception data on the packet data channel in order to extract the packet data.

10. The method of claim 9, further comprising the steps of:
    if it is determined that the reception data on the packet data channel is retransmitted data, determining if corresponding packet data has been previously successfully received; and
    if corresponding packet data has been previously successfully received, discarding the reception data on the packet data channel.

11. The method of claim 10, further comprising the steps of:
    if it is determined that corresponding packet data has not been previously successfully received, acquiring the packet data by decoding the reception data on the packet data channel; and
    combining the acquired packet data with the previously received packet data.

12. A method for providing a broadcast service to mobile stations by a base station that transmits in the same time period a packet service over a single forward packet data channel and a packet data control channel corresponding to the single forward packet data channel, comprising the steps of:
    transmitting a packet data channel assignment message for a broadcast service, if a packet data channel assignment request message including particular broadcast service information is received after transmitting a broadcast service parameter message including parameters for a broadcast service; and
    transmitting packet data for the requested broadcast service at the same time as packet data for the packet service over only the single forward packet data channel, and transmitting control information over a packet data control channel corresponding to the single forward packet data channel.

13. The method of claim 12, wherein the packet data channel assignment message includes a broadcast user identifier (ID) used as packet data address information for a desired broadcast service.

14. The method of claim 13, wherein the broadcast user ID is commonly assigned to a plurality of mobile stations.

15. The method of claim 12, further comprising the step of retransmitting the packet data over the packet data channel if a non-acknowledge signal (NAK) is received from at least one mobile station in response to the transmitted packet data.

16. The method of claim 15, wherein the retransmission step comprises the step of transmitting control information including retransmission information indicating that the packet data is retransmitted data, over the packet data control channel corresponding to the packet data channel.

17. The method of claim 12, further comprising the step of transmitting a next packet data after discarding the packet data if an acknowledge signal (ACK) is received from all or some of the mobile stations receiving the requested broadcast service in response to the transmitted packet data.

18. The method of claim 12, further comprising the step of retransmitting the packet data over the packet data channel, if a non-acknowledge signal (NAK) is received from at least a predetermined number of mobile stations from among all mobile stations receiving the requested broadcast service, in response to the transmitted packet data.

19. The method of claim 18, wherein the retransmission step comprises the step of transmitting control information including retransmission information indicating that the packet data is retransmitted data, over the packet data control channel corresponding to the packet data channel.

* * * * *